(12) United States Patent
Cheung et al.

(10) Patent No.: US 11,043,891 B1
(45) Date of Patent: Jun. 22, 2021

(54) CONTROLLER FOR AN AC/DC OR A DC/AC MULTI-PHASE POWER CONVERTER

(71) Applicant: Hong Kong Applied Science and Technology Research Institute Co., Ltd, Shatin (HK)

(72) Inventors: Sui Pung Cheung, Kowloon (HK); Qing Chun Li, Guangdong (CN); Xin Li, Shatin (HK); Tin Ho Li, Kowloon Bay (HK)

(73) Assignee: Hong Kong Applied Science and Technology Research Institute Company Limited, Shatin (HK)

( * ) Notice: Subject to any disclaimer, the term of this patent is extended or adjusted under 35 U.S.C. 154(b) by 0 days.

(21) Appl. No.: 16/750,247

(22) Filed: Jan. 23, 2020

(51) Int. Cl.
*H02M 7/12* (2006.01)
*H02M 7/48* (2007.01)
(Continued)

(52) U.S. Cl.
CPC .............. *H02M 1/084* (2013.01); *H02M 7/12* (2013.01); *H02M 7/48* (2013.01); *H02P 27/08* (2013.01)

(58) Field of Classification Search
CPC .......... H02M 1/084; H02M 7/00; H02M 7/02; H02M 7/08; H02M 7/12; H02M 7/21;
(Continued)

(56) References Cited

U.S. PATENT DOCUMENTS

| | | | |
|---|---|---|---|
| 6,246,222 B1 | 6/2001 | Nilles et al. | |
| 8,829,869 B2 * | 9/2014 | Kooken | H02M 1/4225 323/271 |
| 2009/0167080 A1 | 7/2009 | Carpenter et al. | |

FOREIGN PATENT DOCUMENTS

| | | |
|---|---|---|
| CN | 102064707 A | 5/2011 |
| CN | 105790626 A | 7/2016 |
| CN | 110190768 A | 8/2019 |

OTHER PUBLICATIONS

A New Current Balancing Method for Digitally Interleaved PFC; Soldano et al.;27th Annual IEE (APEC) 2012.
(Continued)

*Primary Examiner* — Gary L Laxton (57) ABSTRACT

Described is a controller for an AC to DC or a DC to AC multi-phase power converter of a type having N power converter phases, where N is greater or equal to 2. The controller comprises a control module configured to change or vary a phase shift angle of the input current or output current for each of the N power converter phases such that an average phase shift value for each of said N power converter phases over a control module AC line cycle is about, near or substantially the same value. In an embodiment of an AC/DC or a DC/AC multi-phase power converter of a type having N power converter phases arranged in parallel, an advantage of arranging the average phase shift value for each power converter phase to be substantially equal or about equal over an AC line cycle is that it reduces or eliminates any imbalances in the input currents or output currents of the N power converter phases. In preferred arrangements, the control module varies the phase shift angle of the input current or the output current for each of the N power converter phases over each AC line cycle using respective PWM switch control signals.

17 Claims, 6 Drawing Sheets

(51) Int. Cl.
*H02M 1/084* (2006.01)
*H02P 27/08* (2006.01)

(58) Field of Classification Search
CPC ........ H02M 7/217; H02M 7/219; H02M 7/42; H02M 7/48; H02M 7/53; H02M 7/537; H02M 7/5387
See application file for complete search history.

(56) References Cited

OTHER PUBLICATIONS

Current Sharing in Mutiphase Interleaved Converters by Means of One Current Sensor; Schroeder et al.; 15th International Power Electronics and Motion Control Conference.
PCT/CN2020/074068; International Search Report (dated Oct. 28, 2020) and Written Opinion (dated Oct. 21, 2020).

* cited by examiner

| | | Switching cycles | | | | | | | | | | |
|---|---|---|---|---|---|---|---|---|---|---|---|---|
| | | 1 | 2 | 3 | 4 | 5 | 6 | 7 | 8 | 9 | 10 | ... |
| M1 | | 0 | 72 | 144 | 216 | 288 | 0 | 72 | 144 | 216 | 288 | ... |
| M2 | | 72 | 144 | 216 | 288 | 0 | 72 | 144 | 216 | 288 | 0 | ... |
| M3 | $\theta_{ps}$ | 144 | 216 | 288 | 0 | 72 | 144 | 216 | 288 | 0 | 72 | ... |
| M4 | | 216 | 288 | 0 | 72 | 144 | 216 | 288 | 0 | 72 | 144 | ... |
| M5 | | 288 | 0 | 72 | 144 | 216 | 288 | 0 | 72 | 144 | 288 | ... |

CONTROLLER FOR AN AC/DC OR A DC/AC MULTI-PHASE POWER CONVERTER

FIELD OF THE INVENTION

The invention relates generally to a controller for an AC to DC or a DC to AC multi-phase power converter and more particularly to a controller for an AC to DC or a DC to AC multiphase power converter for sharing or balancing current between the multiple power converter phases.

BACKGROUND OF THE INVENTION

Traditionally, single phase power converters have been commonly used. However, such converters are increasingly unable to meet the high-power rating and high-power density requirements of many modern electronic devices. Multiphase power converters are one of the major solutions to the power rating and power density problem, but an issue encountered with multi-phase power converters is that current imbalances can occur between phases which can lead to failure of the power converter.

Multi-phase power converters are now widely used as power supplies for electronic devices such as computer systems to provide regulated voltages for microprocessors, for example. Multiphase power converter topologies operating with two or more phases arranged in parallel can be found deployed in systems whose power consumption increases over time. Examples include computer servers and large communication systems where new system blocks (units) may be added to increase the systems' capabilities and which then require increased power supply capacity.

Multi-phase power converters show several benefits compared with conventional converters such as volume reduction and efficiency. Multi-phase power converters typically consist of N parallel arranged identical topologies (phases) whose pulse width modulation (PWM) switch control signals are in fixed phase shifts of 360°/N relative to one another, where N is the number of phases. Interleaved operation of the power converter phases results in benefits including current ripple reduction and inductor volume reduction. The components in an N-phase converter should be rated for 1/Nth part of the power converter current. However, due to possible component and/or switching cycle deviations between the different phases, the current might be not divided equally without using some active current balancing/sharing scheme. Consequently, in many presently available multi-phase power converters, the components comprising the stages need to be rated much higher than 1/Nth part of the power converter current resulting in the need to use much larger and more expensive components than is necessary in the absence of accurate and efficient current balancing/sharing between phases.

The conventional way to realize current balancing/sharing is to use N current sensors, i.e. one for each phase, where the current in each phase is controlled independently. However, this greatly increases the amounts of components required for each phase and the computational complexity in controlling the phases.

US2009/167080 is an example of a power converter using a plurality of current sensors, each of the current sensors being configured to detect current for a respective phase of the power converter. The multi-phase converter system includes a balancing circuit that can balance the current in the different phases by modulating the current in the plurality of phases independently.

U.S. Pat. No. 6,246,222 describes a DC-to-DC power converter having multiple power channels (phases) and a switching controller which generates a PWM control signal for each power channel. The phase shift angle of each channel is changed-over every so many switching cycles but does not change within a switching cycle. This solution is applicable to only DC-to-DC converters and requires N pulse width modulators to perform current balancing.

The publication entitled "A New Current Balancing Method for Digitally Controlled Interleaved PFC" by M. Soldano and et al., published in the Twenty-Seventh Annual IEEE Applied Power Electronics Conference and Exposition (APEC) 2012 describes an N-phase power converter with two current sensors, one for current shaping and one for current balancing, but where the phase shift angle of each phase is fixed. Furthermore, the power converter requires N−1 additional control loops to perform current balancing.

The publication entitled "Current Sharing in Multiphase Interleaved Converters by Means of One Current Sensor" by Jens C. Schroeder et al., published at the in the 15th International Power Electronics and Motion Control Conference describes current sharing in multiphase converters by means of one current sensor. However, the single current sensor measures the current of the phases which are connected in series to the lower switches.

What is desired is a means and a method of balancing/sharing the phase currents without requiring multiple current sensors and/or additional processing power and which does so within each AC line cycle.

OBJECTS OF THE INVENTION

An object of the invention is to mitigate or obviate to some degree one or more problems associated with known methods of controlling power converters and, in particular, problems associated with controlling known AC/DC or DC/AC multi-phase power converters.

The above object is met by the combination of features of the main claims; the sub-claims disclose further advantageous embodiments of the invention.

Another object of the invention is to provide a means and a method of reducing imbalances in currents between phases in an AC/DC or a DC/AC multi-phase power converter.

Another object of the invention is to provide a means and a method of controlling the phases of a power converter such that each phase has a same or similar average phase shift angle value over an AC line cycle.

A further object of the invention is to provide a means and a method of varying a phase shift angle of an input current or an output current for each of the power converter phases using respective PWM switch control signals.

One skilled in the art will derive from the following description other objects of the invention. Therefore, the foregoing statements of object are not exhaustive and serve merely to illustrate some of the many objects of the present invention.

SUMMARY OF THE INVENTION

The invention concerns a controller for an AC to DC or a DC to AC multi-phase power converter of a type having N power converter phases, where N is greater or equal to 2. The controller comprises a control module configured to change or vary a phase shift angle of the input current or output current for each of the N power converter phases such that an average phase shift value for each of said N power converter phases over a control module AC line cycle is about, near or substantially the same value. In an embodiment of an AC/DC or a DC/AC multi-phase power converter of a type having N power converter phases arranged in parallel, an advantage of arranging the average phase shift value for each power converter phase to be substantially equal or about equal over an AC line cycle is that it reduces or eliminates any imbalances in the input currents or output currents of the N power converter phases. In preferred arrangements, the control module varies the phase shift angle of the input current or the output current for each of the N power converter phases over each AC line cycle using respective PWM switch control signals.

In a first main aspect, the invention provides a controller for an AC/DC or a DC/AC multi-phase power converter having N power converter phases, where N is a natural number greater or equal to 2, the controller comprising: a control module configured to change a phase shift angle for each of said N power converter phases during an AC line cycle to the control module to thereby share current between said N power converter phases. Preferably, the control module is configured to change a phase shift angle for each of said N power converter phases such that an average phase shift value for each of said N power converter phases is about the same value over said AC line cycle. The control module preferably maintains the changed or varied phase shift angles for said N power converter phases out of phase with each other over said AC line cycle.

In a second main aspect, the invention provides an AC/DC or a DC/AC multi-phase power converter comprising: N power converter phases, where N is a natural number greater or equal to 2; and a control module configured to change a phase shift angle for each of said N power converter phases during an AC line cycle to the control module to thereby share current between said N power converter phases.

In a third main aspect, the invention provides a method of operating an AC/DC or a DC/AC multi-phase power converter comprising N power converter phases, where N is a natural number greater or equal to 2, the method comprising: changing a phase shift angle for each of said N power converter phases during an AC line cycle to the control module to thereby share current between said N power converter phases.

The summary of the invention does not necessarily disclose all the features essential for defining the invention; the invention may reside in a sub-combination of the disclosed features.

The forgoing has outlined fairly broadly the features of the present invention in order that the detailed description of the invention which follows may be better understood. Additional features and advantages of the invention will be described hereinafter which form the subject of the claims of the invention. It will be appreciated by those skilled in the art that the conception and specific embodiment disclosed may be readily utilized as a basis for modifying or designing other structures for carrying out the same purposes of the invention.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the FIGS, may be implemented in various forms of hardware, software or combinations thereof. These elements may be implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Figure 1:
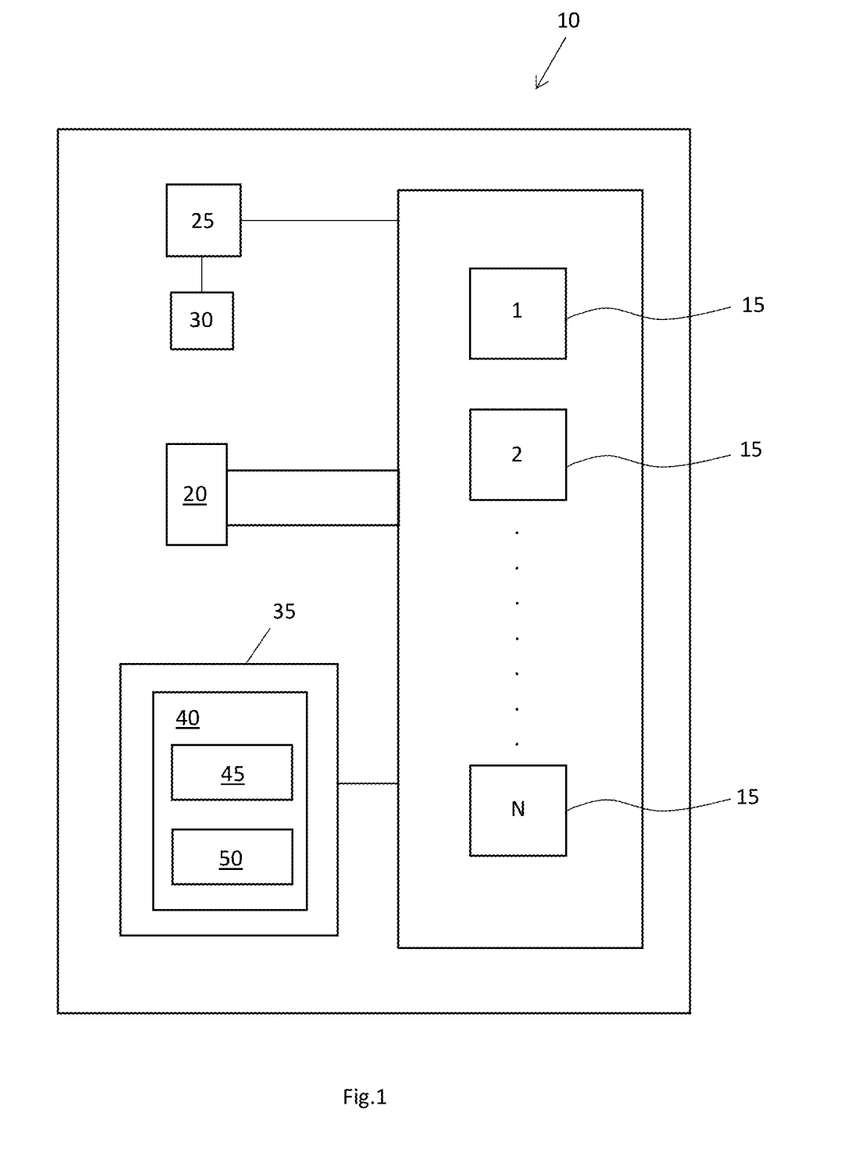
FIG. 1 is a block schematic diagram of an AC/DC or a DC/AC multi-phase power converter in accordance with the invention.

FIG. 1 is a schematic block diagram of power converter 10 in accordance with the invention. The power converter 10 is of a type having N power converter phases 15 denoted as "1" to "N", where N is a natural number greater or equal to 2. The power converter 10 is preferably of a type where the N power converter phases 15 share a voltage supply 20, i.e. the N power converter phases 15 are arranged in parallel with respect to the voltage supply 20. The power converter 10 comprises one of an AC to DC or a DC to AC power converter. The power converter 10 may include a processor 25 and a memory 30, although these are not essential. Some functions of the power converter 10 may be implemented using logic circuits and/or executable code/machine readable instructions stored in the memory 30 for execution by the processor 25.

The power converter 10 has a controller 35. The controller 35 comprises a control module 40 which may be implemented as a microprocessor unit (MCU), as an application specific integrated circuit (ASIC), as a solid-state circuit, or any combination of the foregoing. In the case where the control module 40 comprises an MCU, the control module 40 may have one or more processors 45 and one or more memories 50 for storing machine readable code whereby said machine readable code, when executed by one or more of the processors 45, configures the control module 40 to implement the method of the invention as described below.

In one embodiment, the controller 35 may comprise a plurality of functional blocks for performing various functions thereof. For example, the controller 35 includes the control module 40 and its one or more processors 45 and its one or more memories 50. The controller 35 may therefore be implemented using logic circuits and/or executable code/machine readable instructions stored in one or more of the memories 50 of the controller 35 for execution by one or more of the processors 45 to thereby perform functions as described herein. For example, the executable code/machine readable instructions may be stored in one or more memories 50 (e.g. random access memory (RAM), read only memory (ROM), flash memory, magnetic memory, optical memory or the like) suitable for storing one or more instruction sets (e.g. application software, firmware, operating system, applets, and/or the like), data (e.g. configuration parameters, operating parameters and/or thresholds, collected data, processed data, and/or the like), etc. The one or more memories 50 may comprise processor-readable memories for use with respect to one or more processors 45 operable to execute code segments of the control module 40. Additionally, or alternatively, the controller 35 may comprise one or more special purpose processors (e.g. application specific integrated circuit (ASIC), field programmable gate array (FPGA), graphics processing unit (GPU), and/or the like configured to perform functions of the controller 35 as described herein.

In another embodiment, the controller 35 may be implemented by an analog circuit which may include coding for digital control.

It will be understood therefore that the controller 35 may be implemented by any one or any combination of hardware, firmware and software.

Figure 2:
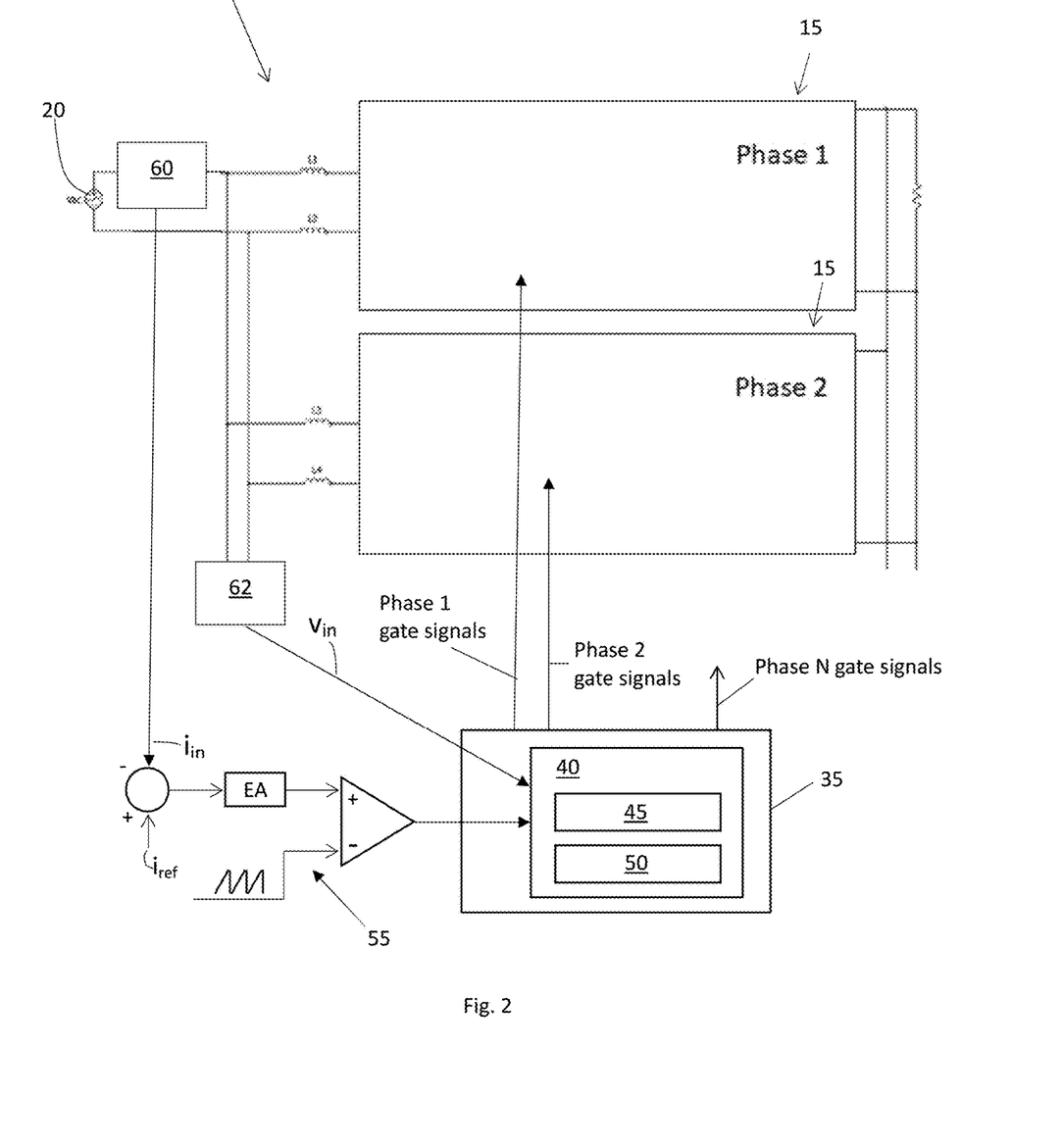
FIG. 2 is a more detailed view of an exemplary embodiment of an AC/DC or a DC/AC multi-phase power converter in accordance with the invention.

FIG. 2 is a more detailed view of the power converter 10 of FIG. 1 showing, for convenience, only two of the N power converter phases 15 denoted respectively as "phase 1" and "phase 2" which are shown in a parallel arrangement with respect to the voltage supply 20 which, in this embodiment, comprises an AC voltage supply.

In FIG. 2, the control module 40 of the controller 35 preferably comprises a single pulse width modulator for supplying PWM switch control signals, e.g. gate signals, to each of the power converter phases 15. An error amplifier (EA) circuit 55, a current sensing circuit comprising a single current sensor 60, and a voltage sensing circuit comprising a single voltage sensor 62 are provided.

It will be understood that, in FIG. 2, all of the power converter phases 15 have the same circuit topology.

The single current sensor 60 is configured to sense the total input current $i_{in}$ of the N power converters 15 and to convert the total input current $i_{in}$ to a voltage signal which is proportional to the total input current $i_{in}$ as an input to the EA circuit 55 to account for the fact that the control module 40 supports voltage signal inputs.

The single voltage sensor 62 is configured to sense the input voltage signal $v_{in}$ to the N power converters 15 to thereby provide the AC line cycle of the control module 40. The AC line cycle of the control module 40 comprises one cycle of the voltage signal $v_{in}$ frequency to the control module 40. Consequently, in some embodiments, the frequency of the voltage signal $v_{in}$ to the control module 40 may comprise a frequency of a grid or mains AC power supply such as voltage supply 20 and the frequency of the voltage signal $v_{in}$ may therefore be fixed or at least suffer little variation. In other embodiments, as will be illustrated by FIG. 3, this is not always the case and the AC line cycle may vary considerably with variations in frequency of the voltage signal $v_{in}$ to the control module 40.

The EA circuit 55 is configured to compare the total input current $i_{in}$ of the N power converters 15 to a reference current $i_{ref}$ (or reference voltage) and output a signal which is the difference of the total input current $i_{in}$ and the reference current $i_{ref}$ to the control module 40. The current difference signal is used by the control module 40 to control the input (or output currents) of the N power converter phases 15 such that their combined currents balance with the total input current $i_{in}$. The AC line cycle derived from the voltage signal $v_{in}$ is used by the control module 40 to share and/or balance the input currents (or output currents of the N power converter phases 15 by way of changing, adjusting and/or varying the phase shift angles of the input currents (or output currents) of the N power converter phases 15.

Figure 3:
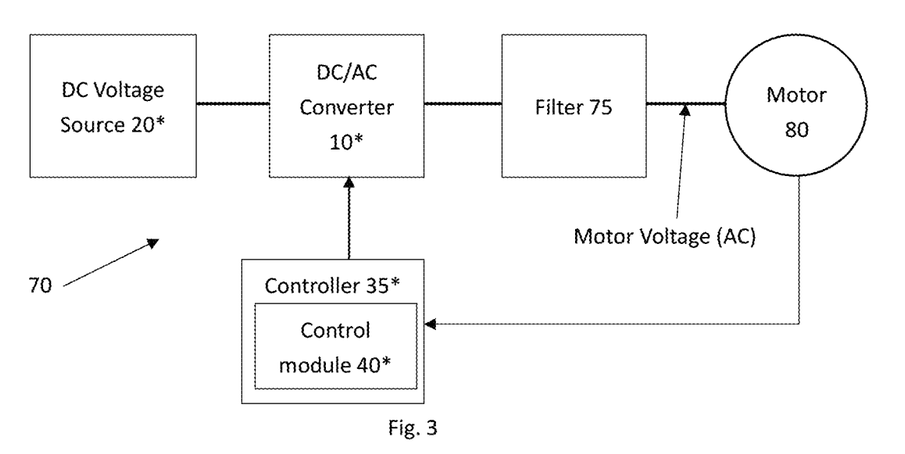
FIG. 3 is a block schematic diagram of a motor control system including a DC/AC multi-phase power converter in accordance with the invention.

FIG. 3 is a block schematic diagram of a motor control system including a DC/AC multi-phase power converter in accordance with the invention. In the description of this embodiment, like numerals to those used in FIGS. 1 and 2 will be used to denote like or functionally similar parts but with such numerals succeeded by a "*".

The motor control system 70 comprises a DC voltage supply 20*, a DC/AC multi-phase power converter 10*, a signal filter 75, a motor 80 and a controller 35*. The controller 35* comprises a control module 40*.

Figure 4:
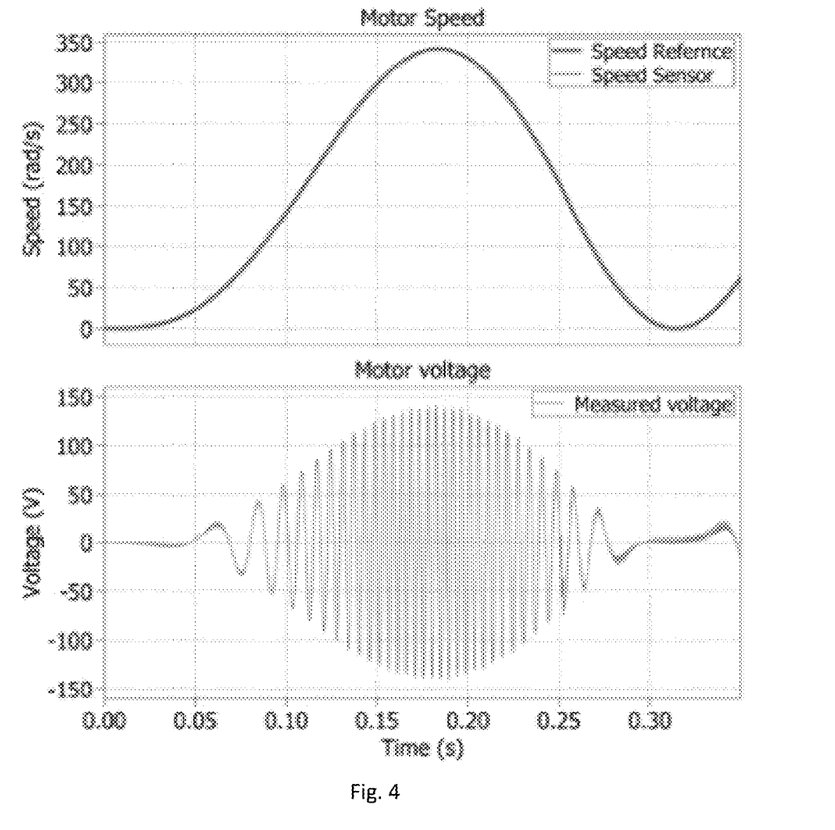
FIG. 4 shows operating parameters of the motor system of FIG. 3 including a motor voltage which comprises the control module AC line cycle.

FIG. 4 illustrates that, as the speed of the motor 80 varies, the frequency of the motor voltage also varies. In this embodiment, the voltage signal $v_{in}$ to the control module 40* is derived from the motor voltage. Consequently, in this embodiment, the AC line cycle to the control module 40* varies with variations in the frequency of the motor voltage.

The embodiment of FIGS. 3 and 4 is merely an example of an embodiment of the invention in which the AC line cycle varies with variations in the frequency of the voltage signal $v_{in}$.

Figure 5:
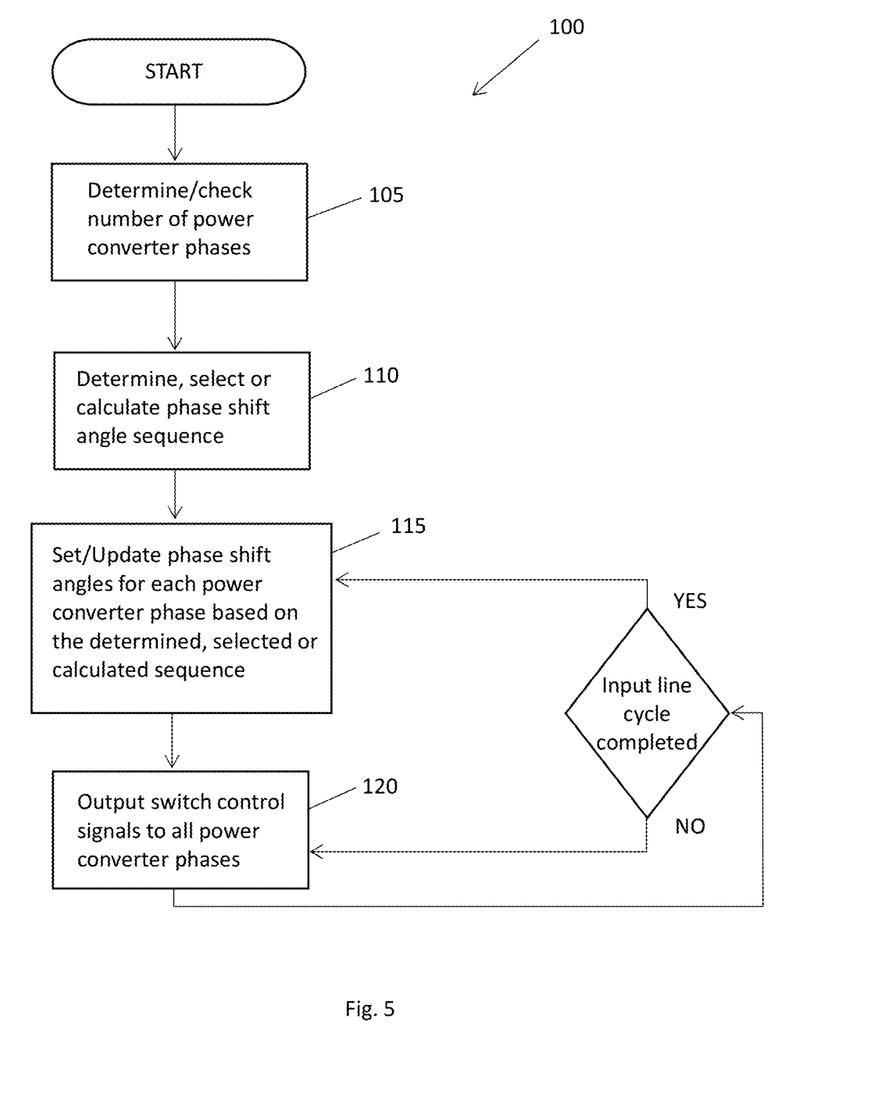
FIG. 5 is a flow chart of a method of controlling an AC/DC or a DC/AC multi-phase power converter in accordance with the invention.

Referring to the flow chart of FIG. 5, an exemplary method 100 in accordance with the invention comprises an optional first step 105 of checking the number of power converter phases 15 comprising the power converter 10, 10*. It will be appreciated that this step is not essential as, in a fixed circuit arrangement, the number of power converter phases will be fixed and known. However, the advantage of this step is to provide an ability to add power converter phase blocks to the power converter 10, 10* and then continue to operate the power converter 10, 10* in accordance with the invention without the need to update any code or machine-readable instructions. In any event, a next step 110 of the method 100 is to determine, select or calculate a phase shift angle sequence to be applied to the power converter phases 15 over the next AC line cycle by the control module 40 using respective PWM switch control signals (gate signals). In a next step 115, the phase shift angle sequences for each power converter phase 15 are established or updated ready for implementation at step 120. At step 120, the respective PWM switch control signals change the phase shift angle of the input current or output current at each power converter phase 15 in accordance with the respective phase shift angle sequences. Following step 120, in a decision box 125, a determination is made as to whether or not the AC line cycle is competed. If "no", then the method at step 120 continues until the AC line cycle is completed. If "yes", then the method may optionally return to step 105 or step 110, but preferably returns to step 115. Thus, in some embodiments, step 110 may be invoked only once at commencement of the method 100 and, once a phase shift angle sequence is determined, selected or calculated, this sequence is used for the duration of the method 100 for every AC line cycle. This latter step is applicable only where the AC line cycle does not vary as in the embodiment of FIG. 2, but it is not applicable to the embodiment of FIG. 3 where the AC line cycle varies in time with variations in the frequency of the voltage signal $v_{in}$, i.e. the motor voltage frequency in this specific embodiment.

The method of the invention seeks to change the phase shift angle of the input current at each power converter phase 15 that an average phase shift value over an AC line cycle for each of said N power converter phases 15 is about the same value and preferably substantially the same value, i.e. it satisfies the condition:

$$\theta_{PS\_1\_avg} = \theta_{PS\_2\_avg} = \ldots = \theta_{PS\_N\_avg}.$$

Thus, a value of the average phase shift angle of the first converter phase 15 over an AC line cycle is about the same as the value of the average phase shift angle of the second convert phase 15 over said AC line cycle which, in turn, is substantially the same as the value of the average phase shift angle of the Nth phase over said AC line cycle. With all of the power converter phases 15 having the same circuit topology, the power drawn by all of said phases 15 will be the same and thus the load current drawn will be the same for a same load voltage.

Whilst it is preferred that the phase shift angle of each of the power converter phases 15 is changed within each AC line cycle in accordance with a predetermined, selected or calculated sequence which has a degree of uniformity or regularity and may even be cyclical in nature, i.e. the sequence has a recognizable pattern of phase shift angles, it will be understood that the sequence need not be uniform, regular or cyclical. It is only necessary that the sequence satisfies the above condition for each power converter phase 15 over each AC line cycle. In this respect, the sequence could be irregular in the pattern of phase shift angles applied to each power converter phase 15 provided that, within each AC line cycle, the control module 40 controls the phase shift angle changes of each power converter phase 15 to meet the foregoing condition.

Simulated results for the method of the invention indicate that it is possible to change the phase shift angle for each of said N power converter phases 15 such that said average phase shift values fall within a range of 15% of a lowest average phase shift value for one of said N power converter phases 15 over the AC line cycle and that it is possible to narrow said range to as low as within a range of 10% of the lowest average phase shift value over the AC line cycle and even as low as within a range of 5% of the lowest average phase shift value over said AC line cycle.

It is, however, preferred that the phase shift angle changes, i.e. the sequence of changes, applied to each power converter phase 15 by the control module 40 does embody a recognizable pattern of phase shift angle changes and that such pattern is cyclical in nature.

A first preferred sequence is defined as:

$$\text{Seq}[\ ] = [0, 2(2\pi/N), 3(2\pi/N) \ldots, (N-2)(2\pi/N), (N-1)(2\pi/N)] \quad (1)$$

Figure 6:
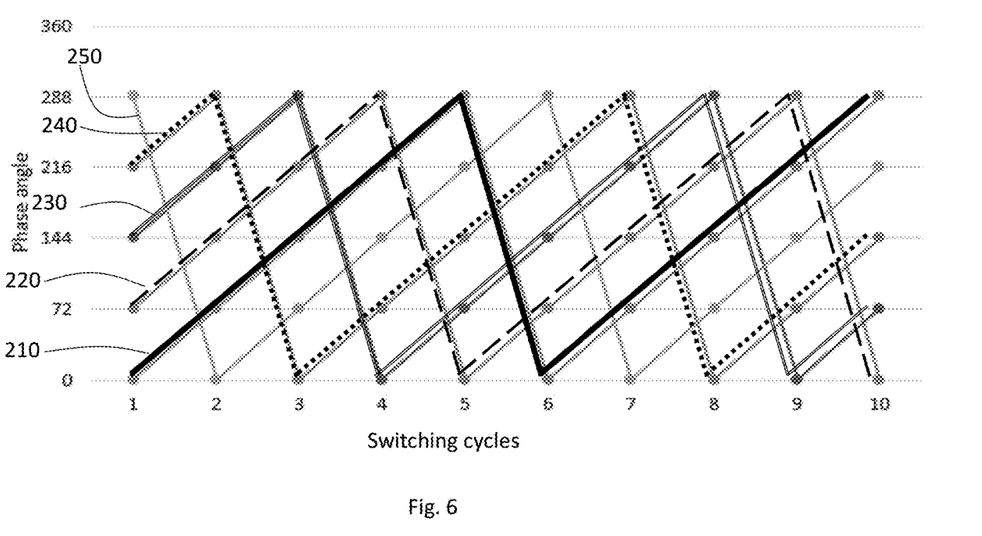
FIG. 6 is a graphical illustration of a first exemplary phase shift angle sequence for a 5-phase AC/DC or a DC/AC power converter in accordance with the invention.
Figure 7:
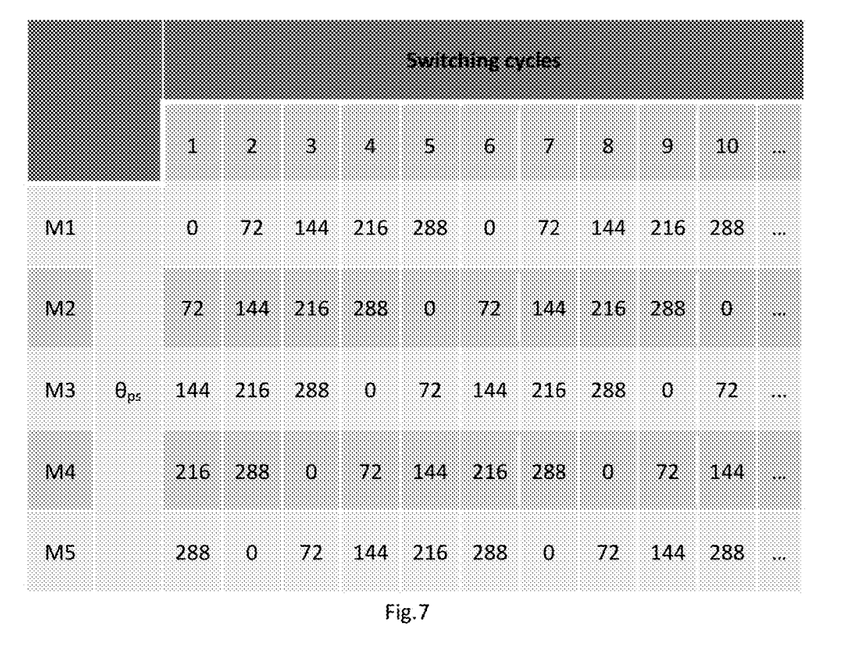
FIG. 7 is a table of the phase shift angle sequence of FIG. 6.

This is illustrated by FIGS. 6 and 7. This sequence comprises a cyclical sequence of phase shift angle changes for each of five phases of a power converter with the cyclical sequences of phase shift angle changes for the five phases being maintained out of phase with each other. In FIG. 6, it will be seen that the number of PWM switching cycles within one AC line cycle for this example comprises 10 PWM switching cycles, i.e. the AC line cycle has a frequency 10 times that of the PWM switching cycle. However, it will be appreciated that this is one example and that, in other embodiments, the number of PWM switching cycles in one AC line cycle may be more or less than 10 and furthermore that the number of PWM switching cycles in one AC line cycle may vary in time as will be the case in the embodiment of FIG. 3.

FIG. 6 is a graphical representation of the cyclical sequences of phase shift angle changes for the five power converter phases with the line denoted as "210" being the graphical line tracing the phase shift angle changes with respect to the 10 switching cycles of one AC line cycle for a first power converter phase denoted as "M1" in FIG. 7 and lines "220", "230", "240" and "250" respectively tracing the phase shift angle changes with respect to the 10 switching cycles of said AC line cycle for the second to fifth power converter phases denoted by "M2", "M3", "M4" and "M5" in FIG. 7.

A second preferred sequence is defined as:

$$\text{Seq}[\ ]=[(N-1)(2\pi/N),(N-2)(2\pi/N),\ldots,3(2\pi/N),2(2\pi/K),0] \quad (2)$$

Figure 8:
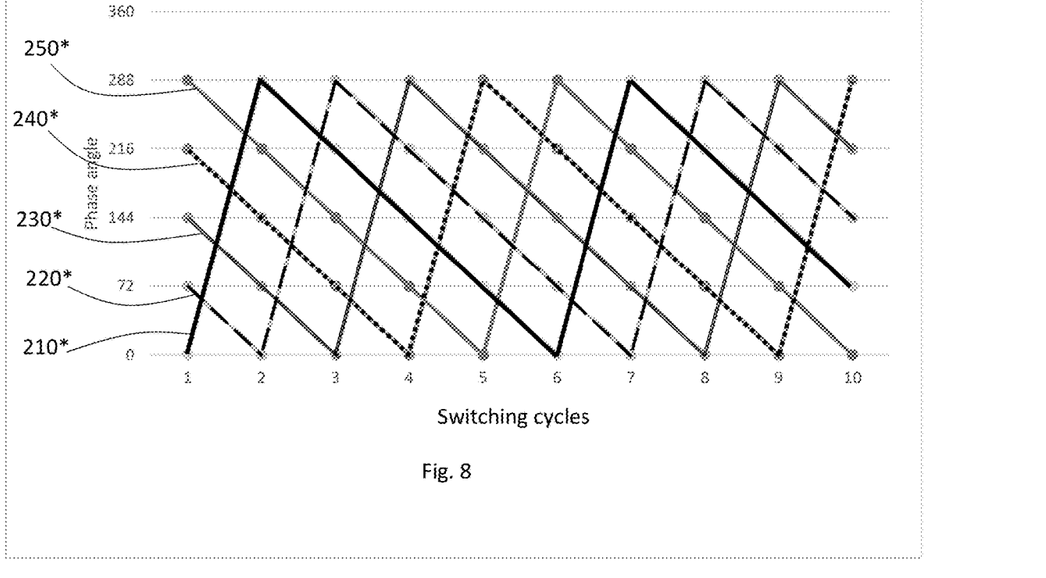
FIG. 8 is a graphical illustration of a second exemplary phase shift angle sequence for a 5-phase AC/DC or a DC/AC power converter in accordance with the invention.

This is illustrated graphically by FIG. 8 with the respective power converter phases denoted by "210*", "220*", "230*", "240*" and "250*". It will be seen that this sequence is the reverse of the first preferred sequence shown in FIG. 6. Again, the cyclical sequences "210*", "220*", "230*", "240*" and "250*" of phase shift angle changes for the five phases are out of phase with each other during each AC line cycle.

A third preferred sequence is defined as:

$$\text{Seq}[\ ]=[0,(N-1)(2\pi/N),2(2\pi/N),\ldots,(N-2)(2\pi/N)] \quad (3)$$

Figure 9:
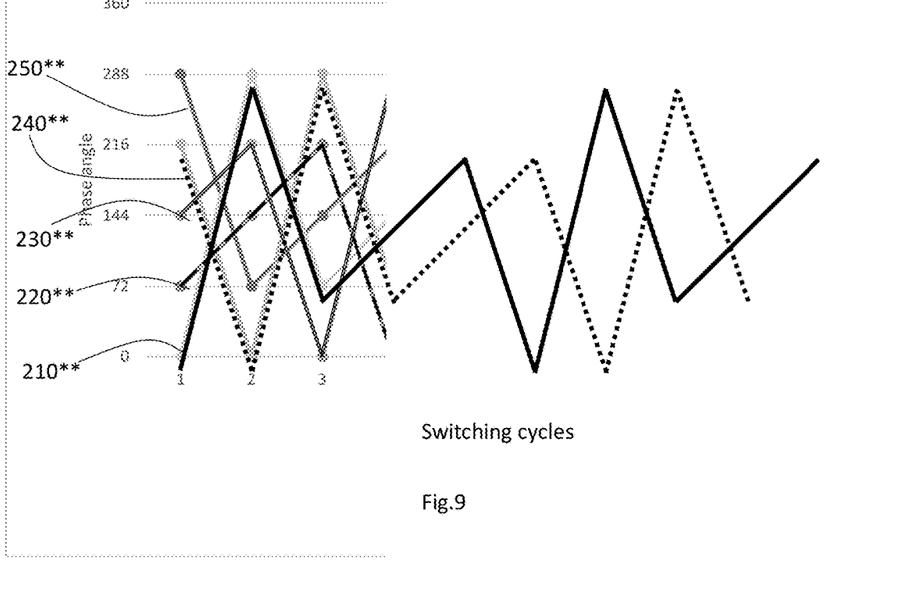
FIG. 9 is a graphical illustration of a third exemplary phase shift angle sequence for a 5-phase AC/DC or a DC/AC power converter in accordance with the invention.

This is illustrated graphically by FIG. 9 with the respective power converter phases denoted by "210", "220", "230", "240" and "250". It will be seen that this sequence has a different cyclical pattern to either of FIG. 6 or 8. Again, the cyclical sequences "210", "220", "230", "240" and "250" of phase shift angle changes for the five phases are out of phase with each other during each AC line cycle.

It will be appreciated that FIGS. 6 to 9 illustrate some preferred cyclical sequences, but it will be understood that the preferred sequences of FIGS. 6 to 9 are merely provided by way of example and are not limiting of the scope of cyclical sequences of phase shift angle changes to be implemented within AC line cycles of the power converter in accordance with the invention.

Referring again to FIGS. 2 and 3, the invention provides a controller 35 for operating multiple power converter phases of a power converter 10 having N power converter phases 15 in parallel with respect to a power input 20 in an interleaved manner. The control module 40 is configured to vary a phase shift angle of an input current (or an output current for each of said N power converter phases 15 over each AC line cycle using respective pulse width modulated (PWM) switch control signals. The control module 40 is configured to vary the phase shift angles for each of said N power converter phases 15 in order to reduce any imbalances between said input currents (or the input voltages).

In preferred embodiments, the N power converter phases 15 each comprise a bridge or bridgeless AC/DC converter or a bridge or bridgeless DC/AC converter.

The invention can balance the phase input currents/voltages without requiring any additional current sensors compared to known multi-phase power converters operating in an interleaved manner by making the phase shift angle of each power converter phase 15 change in a specific sequence along the AC line cycle over a set of PWM switching cycles equivalent to the AC line cycle. The method in accordance with the invention also requires considerably less computational effort (processing power) compared to known multi-phase power converters.

The current balancing method of the invention enables the current of a power converter to be more evenly and accurately balanced/shared between the power converter stages. This has the significant benefit that current in each power converter stage will not greatly exceed 1/Nth part of the power converter current such that components for each power converter stage do not need to be rated excessively higher than 1/Nth part of the power converter current. Consequently, considerably cheaper and less bulky components can be selected for implementing the power converter stages. This is particularly the case with field effect transistors (FETs) such as metal oxide semiconductor FETs (MOSFETs) whose cost rises generally exponentially with current rating. The cost of MOSFETs for an interleaved power converter in accordance with the invention can be reduced by as much as 32% compared to a conventional interleaved power converter of the same capacity. Consequently, the present invention provides a designed of interleaved power converters with the opportunity to design interleaved power converters which are smaller and/or less expensive than conventional interleaved power converter of the same capacity.

The presence of a single PWM modulator as the control module of the present invention is also advantageous in that it reduces or eliminates the known thermal problems affecting known interleaved power converters using multiple PWM modulators. This is especially beneficial in that, in known interleaved power converters employing multiple PWM modulators, the thermal problem adds to the current imbalances between the power converter phases. By reducing or eliminating the thermal issue, the current imbalance problem is already improved prior to implementation of the means and application of the method of the present invention.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A controller for an AC/DC or a DC/AC multi-phase power converter having N power converter phases arranged in parallel with a power supply, each of said N power converter phases having a same circuit topology, where N is a natural number greater or equal to 2, the controller comprising:
a control module configured to change a phase shift angle for each of said N power converter phases during an AC line cycle comprising one cycle of an input voltage signal to the control module, the control module being configured to share current between said N power converter phases by changing the phase shift angle for each of said N power converter phases during said AC line cycle such that an average phase shift value for each of said N power converter phases over said AC line cycle is about the same value.

2. The controller of claim 1, wherein the control module is configured to maintain the changed phase shift angles for said N power converter phases out of phase with each other over said AC line cycle.

3. The controller of claim 1, wherein the control module is configured to change the phase shift angle for each of said N power converter phases such that said average phase shift values fall within a range of 15% of a lowest average phase shift value for one of said N power converter phases over said AC line cycle, or within a range of 10% of a lowest average phase shift value over said AC line cycle, or within a range of 5% of a lowest average phase shift value over said AC line cycle.

4. The controller of claim 1, wherein the control module is configured to change a phase shift angle for each of said N power converter phases by controlling the phase shift angle for each of said N power converter phases to change cyclically over said AC line cycle.

5. The controller of claim 1, wherein the control module is configured to change a phase shift angle for each of said N power converter phases by controlling the phase shift angle for each of said N power converter phases to change in accordance with a predetermined, selected or calculated sequence of phase shift angles over said AC line cycle.

6. The controller of claim 5, wherein the sequence of phase shift angles fulfills the condition: $\theta_{PS\_1.avg} = \theta_{PS\_2.avg} = \ldots = \theta_{PS\_N.avg}$;

where $\theta_{PS\_N}$ is the phase shift angle of the Nth power converter phase.

7. The controller of claim 5, wherein the sequence of phase shift angles is defined by any one of:

Seq[ ]=[0,2(2π/N),3(2π/N) . . . ,(N−2)(2π/N),(N−1)(2π/N)] or

Seq[ ]=[(N−1)(2π/N),(N−2)(2π/N), . . . ,3(2π/N),2(2π/K),0] or

Seq[ ]=[0,(N−1)(2π/N),2(2π/N), . . . ,(N−2)(2π/N)];

where Seq[ ] comprises cyclical sequences of phase shift angle changes for the N power converter phases over the AC line cycle.

8. The controller of claim 1, wherein the control module is configured to change a phase shift angle for each of said N power converter phases by respective switch control signals over each AC line cycle.

9. The controller of claim 8, wherein the switch control signals comprise pulse width modulated (PWM) switch control signals, preferably PWM gate signals.

10. The controller of claim 1, wherein the control module is configured to change a phase shift angle of an input current or an output current for each of said N power converter phases over each AC line cycle.

11. The controller of claim 1, wherein the control module comprises a single PWM module.

12. The controller of claim 1, wherein said control module comprises any one or any combination of hardware, firmware and software.

13. The controller of claim 1, wherein the control module is configured to vary the phase shift angle of an input/output current for each of said N power converter phases over each AC line cycle using respective PWM switch control signals in order to reduce any imbalances between said input/output currents.

14. The controller of claim 1, wherein the control module is configured to vary the phase shift angle of an input/output current for each of said N power converter phases over each AC line cycle using respective PWM switch control signals in order to substantially balance said input/output currents and/or such that an average phase shift value over each AC line cycle for each of said N power converter phases is about the same value.

15. An AC/DC or a DC/AC multi-phase power converter comprising:
N power converter phases arranged in parallel with a power supply, each of said N power converter phases having a same circuit topology, where N is a natural number greater or equal to 2; and
a control module configured to change a phase shift angle for each of said N power converter phases during an AC line cycle comprising one cycle of an input voltage signal to the control module, the control module being configured to share current between said N power converter phases by changing the phase shift angle for each of said N power converter phases during said AC line cycle such that an average phase shift value for each of said N power converter phases over said AC line cycle is about the same value.

16. The AC/DC or a DC/AC multi-phase power converter of claim 15, wherein each of said N power converter phases comprises a bridge or bridgeless AC/DC converter or a bridge or bridgeless DC/AC converter.

17. A method of operating an AC/DC or a DC/AC multi-phase power converter comprising N power converter phases arranged in parallel with a power supply, each of said N power converter phases having a same circuit topology, where N is a natural number greater or equal to 2, the method comprising:
   changing a phase shift angle for each of said N power converter phases during an AC line cycle comprising one cycle of an input voltage signal to the control module to share current between said N power converter phases by changing the phase shift angle for each of said N power converter phases during said AC line cycle such that an average phase shift value for each of said N power converter phases over said AC line cycle is about the same value.

* * * * *